United States Patent [19]

Stauter

[11] 4,187,281

[45] Feb. 5, 1980

[54] HYDROMETALLURGICAL RECOVERY OF COBALT AND NICKEL

[75] Inventor: John C. Stauter, Streamwood, Ill.

[73] Assignee: UOP Inc., Des Plaines, Ill.

[21] Appl. No.: 931,804

[22] Filed: Aug. 7, 1978

[51] Int. Cl.² ............................................. C22B 23/00
[52] U.S. Cl. ..................................... 423/150; 75/103; 75/82; 75/119
[58] Field of Search ................. 75/103, 114, 117, 119, 75/121, 82; 423/32, 38, 51, 150

[56] References Cited

U.S. PATENT DOCUMENTS

| | | | |
|---|---|---|---|
| 3,734,715 | 5/1973 | Redman | 75/21 |
| 3,736,125 | 5/1973 | Wilder | 75/103 X |
| 3,772,423 | 11/1973 | Stevens et al. | 75/103 X |
| 3,772,424 | 11/1973 | Stevens et al. | 75/103 X |
| 3,845,189 | 10/1974 | Miller et al. | 75/103 X |
| 3,953,200 | 4/1976 | Im et al. | 75/103 |

Primary Examiner—G. Ozaki
Attorney, Agent, or Firm—James R. Hoatson, Jr.; Raymond H. Nelson; William H. Page, II

[57] ABSTRACT

Metal values may be recovered from metal bearing sources in a hydrometallurgical process in which a metal bearing source such as an ore and the like is reduced with a reductive roast only or with the presence of at least one additive at temperatures ranging from about 500° to about 900° C. Thereafter the reduced source is subjected to a leach in the presence of a basic leaching agent to extract the desired metals from the source. In the present invention, the basic leaching agent which is employed comprises an ammoniacal ammonium chloride solution.

11 Claims, No Drawings

HYDROMETALLURGICAL RECOVERY OF COBALT AND NICKEL

BACKGROUND OF THE INVENTION

In the processing of materials containing metal values, two of the main extractive methods to be considered are pyrometallurgy and hydrometallurgy. In the former, metal-containing material such as ore, slag, scrap, etc., is heated with appropriate agents such as reducing agents, fluxing agents, sulfidizing agents, chloridizing agents and/or oxidizing agents, etc., usually to the melting or fusion point of the mixture. At this temperature there is generally a separation of metallic values from gangue or waste materials. The procedure then calls for separating the metallic values from slag or waste material at a temperature at which both are molten. The phase containing the metal values is then cast to some convenient shape for use or for further refining, whichever is appropriate for the particular system involved. The very high temperatures involved in this technique are achieved via electric furnaces, blast furnaces, reverberatory furnaces, etc. Temperatures required for metals such as copper, nickel, iron would generally range from about 1100° C. to about 1650° C. An advantage in this method is that recoveries of the metal values are typically quite high.

The hydrometallurgy approach differs substantially from pyrometallurgy in that, although the metal bearing material such as ore, slag, scrap, etc., may be heated with agents such as reducing agents, oxidizing agents, sulfidizing and chloridizing agents as part of the procedure, the temperatures involved are generally much lower than with the usual pyrometallurgical method. These temperatures typically may be about 260° C. to about 1050° C., temperatures generally well below the fusion point of the metal-containing material.

Following this step, the treated metal-containing material then is contacted with an appropriate aqueous solution for extracting metal values by dissolution. The metal is then removed from the solution by precipitation, solvent extraction, evaporation of solvent, etc. The metal-containing residue obtained is then handled appropriately to further refine the metal. Although conditions of temperature are generally much lower than in pyrometallurgy, it is frequently found that recovery of the metal values is also lower than in the pyrometallurgical method.

A particular case where this is true concerns the extraction of nickel and cobalt from lateritic nickel ores. The pyrometallurgical processes range from the use of an electric furnace for the direct smelting of ore to produce ferronickel through similar techniques involving the blast furnace in which an iron-nickel-sulfide matte is obtained. The extraction of nickel from the ore using this method is greater than 90%.

Of the several hydrometallurgy approaches used commercially for treating this type of ore, the practice on a limonite ore or a highly serpentinic ore, such as that at Nicaro, Cuba, involves roasting the ore in a multihearth furnace while a reducing gas, such as producer gas, passes countercurrent to the ore. Temperatures in this case range from about 900° to about 1350° F. Following the roasting step, the ore is cooled in the absence of air, mixed with an ammoniacal ammonium carbonate solution and vigorously agitated and aerated. This results in the dissolution of nickel and cobalt, separating them from the bulk of the ore. This solution then is treated with steam, driving off ammonia and precipitating nickel carbonate. This product then is treated further to obtain the appropriate form of nickel or use as such. In comparison to the pyrometallurgical process, however, nickel extractions using this method have only been of the order of 70 to 80%.

Several other hydrometallurgy methods involve the use of procedures which include a roasting step with chlorides or sulfates but in other than reducing atmospheres, and the roasted ore is leached with an appropriate solvent such as dilute sulfuric acid. Alternatively, in certain cases the ore can be leached directly, such as with sulfuric acid solution but this is practical only when the magnesia content of the ore is low.

The extraction of metal values from metal bearing sources may be improved when the reductive roast is effected in the presence of certain additives such as added hydrogen halide, added sulfur, added sulfur-containing compounds, or combinations of these additives.

As will hereinafter be shown it has now been discovered that when the extraction or leach of the metal bearing source after the reductive roast is effected using an ammoniacal ammonium chloride solution, the extraction of the desired metal such as nickel from the metal bearing source will be accomplished in such a manner so that higher percentages of the desired metal will be extracted from the source with accompanying economical advantages.

This invention relates to an improvement in a process for the obtention of metal values from metal bearing sources. More specifically, the invention is concerned with an improvement in a process for the recovery of metal values from a metal bearing source in which the leach or extraction of the metal from a source which has been subjected to a reductive roast is effected by utilizing an ammoniacal ammonium chloride solution.

While the reductive roast may be effected in the absence of any additives, the dydrometallurgical extraction of metal values has been found to be improved when the reductive roast of the metal bearing source is effected in the presence of additives comprising added hydrogen halide, added solid sulfur, added sulfur-containing compounds or combinations thereof. While the exact reasons for the improved results or the mechanism by which they are accomplished are not known, several explanations therefore may be offered, with the understanding that the applicant does not intend to be limited thereto. One explanation is that the additive may act to reduce or to facilitate reduction of the combined metal or to otherwise assist in liberating the metal, whereby it is readily extractable. Another explanation is that the combination of additives may act or facilitate such action to reduce the nickel in an iron-nickel alloy to thereby convert the nickel into a readily extractable form. Still another explanation is that the combination of additives may act to prevent recombination of the metal into a form in which it is less readily extractable.

It is recognized that different ores respond differently to different additives and that greater improvement in the recovery of metal values may be obtained with some ores when the roasting is conducted in contact with a mixture of added gaseous sulfur compound and added sulfur or in contact with added gaseous sulfur compound and added hydrogen halide or when the roasting is effected in contact with all three of these additives. Also, it is recognized that some added gaseous sulfur compounds will respond differently in this system than other added gaseous sulfur compounds. Accordingly, the specific added gaseous sulfur compound and the added sulfur and/or added hydrogen halide will be selected with reference to the particular ore to be processed.

As hereinbefore set forth, improved recovery of metal values is obtained when the roasting of the metal-containing material such as ore, slag, scrap, etc., is effected in contact with additives such as gaseous sulfur compounds, added solid sulfur, and/or added hydrogen halide, whereby the recovery of the metal value is effected in a considerably higher yield than heretofore obtained in the hydrometallurgical system.

The process of the present invention may be used for the recovery of metal values from ore, slag, scrap or other metal bearing source and is particularly applicable to the recovery of nickel from such sources. However, it is to be understood that the process may be used for the recovery of other metal values including, for example, cobalt, copper, manganese and other metals which are soluble in ammoniacal ammonium chloride solutions, but not necessarily with equivalent results. In the interest of brevity, the following discussion will be directed to the recovery of nickel, with the understanding that it may be applied to the recovery of other metals as hereinbefore set forth.

As another advantage to the present invention, the process may be conducted in conventional apparatus and may utilize much of the conventional steps of prior art processes. Accordingly, the ore such as a lateritic nickel ore or other metal bearing source is prepared in a manner suitable for the process, such as finely divided or comminuted particles in a conventional way. The particles may be within a size range of from about 8 mesh to about 500 mesh or smaller and preferably within a range of from about 48 mesh to about 200 mesh. The particles then preferably are dried in a conventional manner to lower the moisture content of from about the usual 25% to 50% down to about 8% or 10% or less. The drying generally is effected in a rotary kiln at conventional temperatures.

The added solid or gaseous sulfur compound will be used in a sufficient concentration for the purpose and any be within the range of from about 0.01% to about 10% and preferably from about 0.1% to about 5% by weight of the ore. Any suitable sulfur bearing compound may be used in the present invention. Preferred gaseous sulfur compounds comprise hydrogen sulfide, sulfur dioxide, sulfur trioxide, carbonyl sulfide, carbon monosulfide, carbon disulfide, etc. For ease of use, the sulfur compound can also be added in solid form prior to roasting. However, in another embodiment, it may be normally liquid and vaporized prior to use or allowed to vaporize under the conditions existing in the reducing zone. In another embodiment, the added sulfur compound is a hydrocarbyl sulfide including, for example, methyl mercaptan, ethyl mercaptan, propyl mercaptan, butyl mercaptan, pentyl mercaptan, hexyl mercaptan, etc., but generally containing not more than about 20 carbon atoms per molecule. The solid sulfur which may be used will be in solid forms including powder, flour, granules, pellets, etc., as molten or as otherwise liquefied sulfur, as sulfur vapors, or if so desired, sulfur can also be added as metal sulfides such as pyrite. Generally speaking, the sulfur is employed in a concentration of from about 0.01% to about 5% and preferably from about 0.15% to about 3% by weight of the ore. When the additive comprises a hydrogen halide, the hydrogen halide is used in a concentration of from about 0.01% to about 10% and preferably from about 0.1% to about 5% by weight of the ore. Any hydrogen halide gas or liquid may be used and preferably comprises hydrogen chloride or hydrogen bromide. It is also contemplated within the scope of this invention that hydrogen iodide or hydrogen fluoride may also be employed but not necessarily with equivalent results. In still another embodiment, a precursor of hydrogen halide may be used and may be selected from free halogen, chlorine, bromine, iodine, fluorine or other suitable compounds selected from boron halides, carbon halides, phosphorous halides, silicon halides, etc. In still another embodiment, the precursor may comprise a hydrocarbon halide which preferably contains not more than about 20 carbon atoms per molecule.

It is therefore an object of this invention to provide an improvement in a process for effecting the recovery of metal values from a metal bearing source by utilizing a certain basic compound as a leach agent.

In one aspect an embodiment of this invention resides in a hydrometallurgical process for the recovery of metal values from a metal bearing source containing a metal selected from the group consisting of nickel, copper, cobalt and manganese which comprises the steps of roasting the source in a reducing atmosphere with or without additives at a temperature in the range of from about 550° to about 900° C., cooling the roasted material and extracting the same with a basic leaching agent, and recovering the desired metal value, the improvement which comprises utilizing ammoniacal ammonium chloride as said basic leaching agent.

A specific embodiment of this invention is found in a hydrometallurical process for the recovery of nickel from a lateritic ore which comprises pretreating at least a portion of said ore with a mixture of hydrochloric acid and sulfur compound, roasting the treated ore in a reducing atmosphere at a temperature in the range of from about 550° to about 900° C., cooling the roasted ore, extracting the cooled ore with an ammoniacal ammonium chloride solution to provide a solution containing dissolved nickel metal values and recovering the desired nickel metal values.

Other objects and embodiments will be found in the following further detailed description of the present invention.

As hereinbefore set forth, the present invention is concerned with an improvement in the hydrometallurgical recovery of nickel values from metal bearing sources utilizing an ammoniacal ammonium chloride solution as the leaching agent. By utilizing ammoniacal ammonium chloride instead of the conventional leaching agent such as ammoniacal ammonium carbonate, it is possible to extract a higher percentage of nickel from the metal bearing source as compared to other ammoniacal leach agents such as carbonates and sulfates. In addition, the ammoniacal ammonium chloride solution will provide a pH which is high enough to prevent dissolution of the high amounts of the iron, thus contaminating the nickel bearing source, nor will it result in a high consumption of reagent.

In one embodiment the ore particles are preferably dried prior to roasting following which the dried particles are supplied to a suitable reducing zone. In this reducing zone, if so desired, the ore or at least a portion of the ore is contacted with at least one additive of the type hereinbefore set forth such as a hydrogen halide, a precursor thereof, a sulfur compound either in solid or gaseous form, etc. When both a hydrogen halide or precursor thereof and a sulfur compound are utilized, the hydrogen halide may be supplied either separately or in admixture with the sulfur to the reducing zone. The sulfur may be in solid form such as powder, flour, granules, pellets, etc., or molten or otherwise liquefied sulfur or as sulfur vapors.

The reduction of the metal bearing source which may or may not contain an additive is effected in the presence of a reducing gas at a temperature in the range of from about 400° to about 900° C. or more and preferably at a temperature in the range of from about 550° to about 850° C. Conventional reducing zones which may be utilized will include, for example, multiple hearth furnaces, fluosolids roasters, etc. The chemical reduction of the metal bearing source such as the ore is effected by means of a suitable reducing gas mixture which is of the general type used in conventional processes. Any suitable reducing gas mixture may be used and preferably comprises a mixture of hydrogen, carbon monoxide, carbon dioxide and water vapor. The gas mixture which is used may come from any suitable source, including producer gas, gases formed by the combustion of city gas, gases formed by the combustion of oils, etc. The specific gas mixture will be selected to effect the desired reduction of the nickel compounds. An illustrative gas mixture comprises a $CO:CO_2$ ratio within the range of about 0.1:1 to 10:1, a $CO:H_2$ ratio within the range of from about 0.1:1 to 10:1 and a $H_2:H_2O$ vapor ratio within the range of about 0.1:1 to 10:1, all being on a volumetric basis. In one embodiment, it is desirable to maintain the gas mixture within the ratios set forth above because an excessive concentration of one or more of the components in the gas mixture may have undesired effects such as, for example, incomplete reduction of the metal compound, excessive adsorption of the gas in the ore particles, etc. It is understood that the gas mixture may contain other components as, for example, nitrogen, when advantages appear therefor. Another illustrative gas mixture comprises hydrogen, nitrogen and water vapor. Still another gas mixture may comprise natural gas. In another method, solid reducing agents, such as coke, etc., may be used.

The reducing step is effected in relatively short times, high recoveries of metal values being obtained when utilizing roasting times of about 0.5 hours to 1.0 hours. However, it is also contemplated within the scope of this invention that longer roast times may be used if so desired. Some advantages which are present when utilizing the process of this invention include the fact that the pretreatment, crushing, grinding, drying and reducing steps may be conducted in conventional apparatus. Also, as another advantage, the hydrometallurgical process is effected at lower temperatures than the pyrometallurgical process of the prior art and therefore, avoids the objections which are inherent in the higher temperature reduction processes.

The reduced ore particles are withdrawn from the reducing zone and then processed in conventional manner for the hydrometallurgical extraction of the nickel. The effluent from the reduction zone is first cooled several hundred degrees and then is passed into one or more quench zones. In a preferred embodiment, the quench liquid is the ammonium chloride leaching solution. However, the quenching must be effected in the absence of air. In other words, oxygen or air should not contact the reduced particles until the temperature of the particles is below about 95° C. because of the possibility of oxidation of the metal to the oxide or to other oxygen-containing compounds. It is understood that other suitable quenching solutions may be employed but, as hereinbefore set forth, economical advantages appear for the use of the leaching solution for this purpose.

In contradistinction to other ammoniacal leaching solutions such as ammoniacal ammonium carbonate or sulfate which have been used in the prior art, it has now been discovered that by utilizing an ammoniacal ammonium chloride solution containing from about 4 to about 8 moles of ammonia and from about 0.5 to about 3 moles of chloride, it is possible to obtain a higher extraction of nickel from the ore than has been previously accomplished when using equivalent leach strengths. This has been found to be the case whether or not the ore has been pretreated with additives. By utilizing such a leaching agent, the pH at which said leach is effective will be maintained at a level sufficiently high to prevent the dissolution of relatively high amounts of iron into the solution thus contaminating the nickel solution and requiring subsequent steps of purification in order to remove this contaminate. The leaching step of this process is effected at a temperature below about 95° C. and preferably at ambient temperature. In addition, the leaching of the reduced ore may be effected at atmospheric pressure; however, if so desired, superatmospheric pressures may also be utilized but generally will not exceed about 100 psig. As hereinbefore set forth, the leaching is effected in the presence of oxygen which may comprise ambient air when the leaching is effected in open tanks or vessels, or it may comprise air, oxygen or other suitable oxygen-containing sources when superatmospheric pressures are utilized by the introduction of these atmospheres into closed zones.

The leaching or extraction of the ore is effected in any suitable manner and is generally effected by passing the ore countercurrently to the leaching solution in a plurality of leaching and thickening zones, conventional apparati being used for the step.

A leach solution containing nickel which is withdrawn from the leaching and thickening zone is then treated in any suitable manner required to effect the recovery of the nickel. By utilizing the process of the present invention, especially the use of ammoniacal ammonium chloride in the leaching step, it is possible to obtain nickel recoveries greater than 90%. Furthermore, as hereinbefore set forth, low iron content ores may be treated in an economical manner to recover nickel therefrom, in contrast to the former requirement of using the high temperature pyrometallurgical process, or in not being able to effect such recovery in an economical manner. If so desired, the undissolved solids which are separated in the ammoniacal leach step are water washed and steam stripped to recover ammoniacal compounds which may be reused in the system.

The following examples are used as illustrations of the process of the present invention. However, it is to be understood that these examples are given merely for the purposes of illustration and are not intended to limit the generally broad scope of the present in strict accordance therewith.

EXAMPLE I

In the following examples the sample of lateritic ore which was used possessed the following assay:

|  | Weight % |
| --- | --- |
| Nickel | 1.24 |
| Cobalt | 0.14 |
| Iron | 36.9 |
| Silica | 14.7 |
| Alumina | 2.1 |

In this example 100 grams of the dried ore was placed in a reduction tube and reductively roasted for a period of ½ hour through a rising temperature profile which ranged from 371° to 788° C. using a reducing gas which possessed the following dry basis composition:

$H_2$—30 Vol. %
CO—10 Vol. %
$CO_2$—22 Vol. %
$N_2$—38 Vol. %, said gas being passed through a water bubbler at ambient temperature and then charged through the tube at a dry basis flow rate of 1800 cc/min. Upon completion of the reduction, the reduced ore was subjected to a nickel and cobalt ammoniacal extraction using a series of various ammoniacal leach solutions of high and low strengths. In the first leach the ore was extracted with an ammoniacal ammonium carbonate. In Leach A the ammoniacal ammonium carbonate contained 4.17 moles of ammonia and 0.81 moles of carbonate. In Leach B the ammoniacal ammonium carbonate contained 7.4 moles of ammonia and 2.27 moles of carbonate.

In the second extraction the leaching agent comprised ammoniacal ammonium sulfate. Leach C contained 4.17 moles of ammonia and 0.81 moles of sulfate, while in Leach D the leaching solution contained 7.4 moles of ammonia and 2.27 moles of sulfate. In the third extraction the leach solution comprised ammoniacal ammonium chloride. Leach E contained 4.17 moles of ammonia and 0.81 moles of chloride while Leach F contained 7.4 moles of ammonia and 2.27 moles of chloride. The percentage of extraction of nickel and cobalt are set forth in Table I below:

TABLE I

| Leach | % Nickel Extracted | % Cobalt Extracted |
| --- | --- | --- |
| A | 86.5 | 49.9 |
| B | 88.5 | 70.9 |
| C | 87.0 | 51.5 |
| D | 87.3 | 81.4 |
| E | 88.3 | 46.2 |
| F | 90.3 | 72.1 |

EXAMPLE II

In this example a sample of the lateritic ore was also reductively roasted in a manner similar to that set forth in Example I above. However, prior to being subjected to the reductive roast in the presence of a reducing gas the ore was pretreated by adding 1 wt. % (1 gram) of elemental sulfur, well mixed with the ore, following which the ore sample was then reductively roasted under conditions identical in nature to those set forth in Example I. The reduced ore was then leached with ammoniacal ammonium carbonate, ammoniacal ammonium sulfate and ammoniacal ammonium chloride in low and high strengths similar to that set forth in Example I above. The extraction of nickel with ammoniacal ammonium carbonate was performed in the two strengths (4.17 moles of $NH_3$, 0.81 moles of carbonate and 7.4 moles of $NH_3$, 2.27 moles of carbonate respectively) in Leaches G and H; extraction with ammoniacal ammonium sulfate in the two strengths set forth above was done in Leaches I and J while the leaches with ammoniacal ammonium chloride in the two strengths set forth above were done in Leaches K and L. The results of these extractions are set forth in Table II below:

TABLE II

| Leach | % Nickel Extracted | % Cobalt Extracted |
| --- | --- | --- |
| G | 88.3 | 33.6 |
| H | 90.5 | 60.1 |
| I | 86.8 | 57.0 |
| J | 91.6 | 76.5 |
| K | 90.6 | 46.6 |
| L | 92.5 | 79.6 |

EXAMPLE III

In this example a dry sample of lateritic ore having an assay similar to that set forth in Example I above was dried and reductively roasted for a period of ½ hour at a temperature in the range of from 371° to 788° C. using a reducing gas of the same composition as that set forth in Example I above. Prior to subjecting the ore to a reductive roast, the ore was pretreated by the addition of 1 wt. % of elemental sulfur (1 gram) and 4 wt. % of hydrogen chloride (4 grams). The hydrogen chloride was added as a 20% azeotrope solution thus producing a damp ore charge to the reduction tube. The sample was then reduced at the aforesaid temperature for a period of 30 minutes with the addition of 2 volume % of hydrogen chloride gas added and based on a dry reducing gas analysis.

The reduced ore was then leached using ammoniacal ammonium carbonate, ammoniacal ammonium sulfate and ammoniacal ammonium chloride as the leach solution, each high and low leach solution containing the same number of moles of ammonia, carbonate, sulfate and chloride as set forth in Example I. The leaching with the two strengths of ammoniacal ammonium carbonate were designated as Leach M and N, the two leaches of different strengths with ammoniacal ammonium sulfate being designated as Leaches O and P and the two leaches with ammoniacal ammonium chloride of different strengths were designated as Leaches Q and R. The results of these extractions are set forth in Table III below:

TABLE III

| Leach | % Nickel Extracted | % Cobalt Extracted |
| --- | --- | --- |
| M | 91.2 | 30.8 |
| N | 89.2 | 53.5 |
| O | 88.9 | 41.9 |
| P | 90.6 | 49.8 |
| Q | 91.1 | 34.0 |
| R | 94.4 | 72.6 |

It is readily apparent from a comparison of the leaches set forth in Tables I, II and III above that by utilizing an ammoniacal ammonium chloride as the leaching agent it is possible to attain equivalent and most times a greater extraction of nickel than when using other ammoniacal ammonium compounds such as the carbonate and sulfate. For example, when the ore was not pretreated prior to reduction the highest amount of nickel extracted was 88.5% when using the higher strength ammoniacal ammonium carbonate leach solution and 87.3% when using the higher strength ammonium sulfate leach solution as contrasted to the obtention of 90.3% nickel when using the higher strength ammoniacal ammonium chloride leach. Similar extraction relationships were also noted when comparing the use of lower strength leach solutions.

Likewise, when subjecting the dried ore to a pretreatment with elemental sulfur prior to a reductive roast, it was possible to obtain approximately 1 to 2% higher nickel extraction when using higher strength ammoniacal ammonium chloride leach solution than when using higher strength ammoniacal ammonium sulfate or carbonate leach solutions. Likewise, when using a lower strength ammoniacal ammonium chloride leach it was possible to obtain from 2 to 4% more nickel than when using lower strength ammoniacal ammonium carbonate or sulfate. In addition when subjecting the ore to a pretreatment comprising a mixture of elemental sulfur and hydrogen chloride, it was possible to obtain a 94.4% extraction of nickel when using higher strength ammoniacal ammonium chloride as compared to the 89.2% extraction of nickel which is obtained when using a high strength ammoniacal ammonium carbonate and 90.6% when using a high strength ammoniacal ammonium sulfate leach. Use of low strength ammoniacal ammonium chloride resulted in the obtention of an equivalent amount of nickel which was obtained when using a low strength ammoniacal ammonium carbonate, but 2% more than when using a low strength ammoniacal ammonium sulfate.

I claim as my invention:

1. In a hydrometallurgical process for the recovery of nickel and cobalt metal values from a source containing the same which comprises:
    (a) roasting said source in a reducing atmosphere at a temperature in the range of from about 550° to about 900° C. in contact with a roast additive selected from the group consisting of solid sulfur in the concentration of about 0.01 to about 5% by weight of said source, gaseous sulfur compounds in the concentration of about 0.01 to about 10% by weight of said source, hydrogen halide in the concentration of about 0.01 to about 10% by weight of said source, and combinations thereof;
    (b) cooling said roasted material in the absence of air until said reduced source obtains a temperature below about 95° C. and extracting the same below about 95° C. in the presence of an oxygen-containing gas with a basic leaching agent at a pH sufficiently high to prevent dissolution of high amounts of iron from said source; and
    (c) recovering said desired nickel and cobalt metal values, the improvement which comprises utilizing ammoniacal ammonium chloride as said basic leaching agent of step (b).

2. The process as set forth in claim 1 in which said metal value is nickel.

3. The process as set forth in claim 1 in which said metal value is cobalt.

4. The process as set forth in claim 1 in which said metal bearing source is a lateritic ore.

5. The process as set forth in claim 1 in which said source is pretreated with at least one additive prior to being subjected to said reductive roast.

6. The process as set forth in claim 5 in which said additive is a hydrogen halide.

7. The process as set forth in claim 5 in which said hydrogen halide is hydrochloric acid.

8. The process as set forth in claim 5 in which said additive is a gaseous sulfur compound.

9. The process as set forth in claim 1 in which said solid sulfur is elemental sulfur.

10. The process as set forth in claim 8 in which said gaseous sulfur compound is sulfur dioxide or hydrogen sulfide.

11. The process as set forth in claim 5 in which said additive is a mixture of hydrogen halide and a gaseous sulfur compound.

* * * * *